United States Patent [19]

Norling et al.

[11] 4,206,271
[45] Jun. 3, 1980

[54] METHOD OF MANUFACTURING HIGHLY POROUS ELECTRODE BODIES FOR ELECTRICAL ACCUMULATORS AND ELECTRODE BODIES THUS OBTAINED

[75] Inventors: Sten B. C. Norling, Lincoln, R.I.; Lars H. Swenne, Oskarshamn, Sweden

[73] Assignee: Nife Jungner AB, Oskarshamn, Sweden

[21] Appl. No.: 20,093

[22] Filed: Mar. 13, 1979

[30] Foreign Application Priority Data

Mar. 30, 1978 [SE] Sweden ............................. 7803569

[51] Int. Cl.$^2$ .................... H01M 4/88; H01M 4/90
[52] U.S. Cl. ................................ 429/45; 75/222; 252/182.1; 429/223; 429/235
[58] Field of Search ................... 429/45, 223, 235; 75/222; 252/182.1

[56] References Cited

U.S. PATENT DOCUMENTS

| | | | |
|---|---|---|---|
| 3,350,200 | 10/1967 | Sandstede | 75/222 |
| 3,367,801 | 2/1968 | Kreiselmaier | 429/45 |
| 3,382,067 | 5/1968 | Sandstede et al. | 75/222 |
| 3,414,438 | 12/1968 | Lindholm et al. | 429/45 |
| 3,441,390 | 4/1969 | Backe et al. | 429/45 |

*Primary Examiner*—Donald L. Walton
*Attorney, Agent, or Firm*—Burns, Doane, Swecker & Mathis

[57] ABSTRACT

A method is disclosed for the manufacture of a highly porous nickel electrode body for electrical accumulators. The new electrode body is also disclosed. By using 5–7% by volume of a nickel powder in admixture with 93–95% by volume of a pore-forming agent selected from the group consisting of ammonium bicarbonate and ammonium carbonate when pressing and sintering the electrode body a very high porosity is obtained, such as 90–95%, in spite of which the mechanical strength of the body is so high as to resist the strains of an accumulator cell. Especially preferable to impart outstanding strength to the electrode body, is a pressure of at least 100 MPa in the pressing operation.

12 Claims, No Drawings

METHOD OF MANUFACTURING HIGHLY POROUS ELECTRODE BODIES FOR ELECTRICAL ACCUMULATORS AND ELECTRODE BODIES THUS OBTAINED

The present invention relates to a method of manufacturing highly porous electrode bodies for electrical accumulators and to the electrode bodies thus obtained.

Porous electrode bodies are utilized in electro-chemical cells, partly in so-called fuel cells or half-fuel cells, partly in electrical accumulator cells. As concerns first-mentioned cells the electrode is manufactured from an electrically conducting material that is activated so as to enable the electrode body to act as a catalyst for an energy producing reaction between two components, at least one of which is continuously fed to the cell from an external source during the reaction time. The function of the porosity of the electrode body is to provide a large contact area between the catalyst part and the electro-chemically active components and an ion-transporting electrolyte in the cell. However, in the case of an electrode body for an electrical accumulator an electro-chemically active material is fed into the pores thereof and the pore system serves as a storage space for said electro-chemically active material. Part of the pore space must, however, still be open to enable access to the electrolyte to all parts of the incorporated active material.

When constructing electrical accumulators one strives for obtaining from the accumulator the maximum of electrical energy per unit of weight thereof. In view of this, it is desirable to utilize electrode bodies having the maximum pore volume to maximize the storage of active material in the electrode body. However, a limiting factor is that generally the mechanical strength of the electrode body decreases with increasing pore volumes. Due to the fact that the active material of an electrical accumulator undergoes volume changes in the repeated operational chargings and dischargings the strength of the electrode body is exposed to strains. Especially when manufacturing relatively thick electrodes, of the order of 3-6 millimeters, it is difficult to combine the requirements for large pore volumes and good strengths.

The manufacture of porous electrode bodies is for instance performed by using a metal powder, for example carbonyl nickel, which is placed in a graphite mold and the loosely packed or pressed powder is sintered in an oven with a reducing atmosphere. Generally a reinforcement, for example in the form of a metal net, is embedded in the sinter body in order to enhance the mechanical strength and improve the electrical conductivity thereof. It is also possible to mix the metal powder with a binder, for instance a cellulosic binder, to form a slurry which is dried, rolled and sintered in an oven.

In order to obtain greater pore volumes there are sometimes also used pore-forming agents, for example in the form of salts, which after the sintering operation are leached out from the pores or which are burnt or gasified in the sintering operation. Suitable pore-forming agents of the latter kind, which are known for use in the manufacture of sintered electrode bodies, are ammonium bicarbonate and ammonium carbonate. There are several patents disclosing the use of said pore-forming agents, and generally they are used in amounts of about 60-85% by volume of the powdered mixture to be used for the final electrode body. The electrode bodies thus obtained have porosities from e.g. 60 up to about 85%. This is acceptable as concerns electrodes for fuel cells and hitherto one has acquiesced in such results also for powder-sintered electrode bodies for electrical accumulators. In some exceptional case, such as is disclosed in e.g. U.S. Pat. No. 3,802,878, it has been possible to reach a porosity of about 90%. Thus, in Example 6 of said U.S. patent it is disclosed that by the use of $BaF_2$ in an amount of 92% by volume an electrode body is obtained which possesses a porosity of about 90%. In this connection it should be noted, however, that barium fluoride is that type of pore-forming agent which must be leached out by means of a washing operation, which operation is not favourable to the strength of the final electrode body.

However, according to the present invention it has turned out possible to obtain highly porous electrode bodies which in spite of their high porosity possess sufficient strength to resist the strains in an accumulator cell. In this case "highly porous" or "high porosity" generally means a porosity of about 90 to 95%, i.e. by the method according to the invention it has shown possible to obtain porosities above 90%, the strengths of the electrode bodies still being excellent so as to enable the use of the electrode bodies in accumulators.

This is achieved by mixing into an intimate mixture 5-7% by volume of a nickel powder with 93-95% by volume of, as a pore-forming agent, powdered ammonium bicarbonate or ammonium carbonate, or a mixture of said pore-forming agents. The mixture thus obtained is then pressed in a mold into a compacted body. Optionally said mixture of nickel powder and pore-forming agent is pressed on a conductive support. Then the compacted body is sintered to form the desired highly porous electrode body.

As concerns the molding pressure it has unexpectedly turned out that a relatively high pressure imparts to the electrode body outstanding mechanical strength without reducing the porosity thereof. Thus, according to a specially preferable embodiment of the invention the molding pressure is at least 100 MPa. Otherwise, the pressing operation is performed in a conventional manner.

The sintering of a nickel powder is generally performed at temperatures above 850° C., preferably above 900° C., and said temperatures are also applicable to the present method. However, it has also turned out that when using the claimed method the sintering temperature can advantageously be raised to between 1000° C. and 1100° C., which means considerable savings of time.

When a porosity above 90% is desired, a preferable range as concerns the amount of the pore-forming agent is 94-95% by volume, based on the total amounts of the powders used, as said high porosity can be obtained by means of high molding pressures, which in turn means high mechanical strength.

Another preferable embodiment of the invention involves the use of a powdered pore-forming agent, the particle size of which is not too small, preferably at least 0.3 millimeters, as this has a favourable effect on the pores and the porosity of the electrode body.

The invention will now be described more in detail in connection with some experiments made.

It could be expected that the sintering of a loosely packed nickel powder would lead to electrode bodies having high porosities. In order to make an ascertainment thereof carbonyl nickel powders having average particle sizes of 2.6–3.4 microns according to Fisher (air-permeability methods), were sieved directly into a mold through a sieve with a mesh of 0.33 millimeters. The sintering operations were performed in an oven at 980° C. and with a mixture of nitrogen and hydrogen gases as protective atmosphere. When performing sintering operations with different sintering times it turned out that porosities of about 75% were obtained when using a sintering time of 40 minutes, while the porosities decreased with increasing sintering times, a value below 60% being reached at about 100 minutes. These degrees of porosity were considered completely insufficient.

The corresponding sintering experiments were performed with compacted mixtures of nickel powders having the same particle sizes as above with pore-forming agents in the form of salts, the following salts being tested: ammonium carbonate, ammonium bicarbonate, barium chloride, potassium carbonate, sodium carbonate and nickel formate. The sintering operation was intended to be performed as described above but as concerns the potassium carbonate and the sodium carbonate said pore-forming agents melted below the temperature at which the nickel grains sinter together into a coherent body, and as concerns the nickel formate it decomposed below said sintering temperature and caused a bursting of the electrode body. In addition to ammonium carbonate and ammonium bicarbonate, barium chloride was the only pore-forming agent that passed the first test and gave a coherent porous electrode body. However, when comparing barium chloride with the ammonium compounds, ammonium carbonate and ammonium bicarbonate turned out to give electrode bodies with higher strengths than those electrode bodies with similar porosities which were prepared by means of barium chloride as the pore-forming agent, as is disclosed more in detail below. Another advantage associated with the use of ammonium carbonate or bicarbonate is that they are totally gasified in the sintering operation, which means that the pore-forming agent need not be leached out after the sintering operation.

With reference to a comparison between ammonium carbonate and ammonium bicarbonate, bodies manufactured by means of ammonium bicarbonate as a pore-forming agent got a somewhat coarse-grained structure. When using ammonium carbonate as a pore-forming agent homogeneous and porous bodies were obtained which had porosities up to above 93%. The used ammonium carbonate was of a crystalline quality (P.A.) and was ground in a mortar and sieved through a sieve with a mesh of 0.33 millimeters. However, another ammonium carbonate of commercial quality imparted to the body the similar coarse-grained structure as in the experiments with the ammonium bicarbonate. The experiments indicate that the two pore-forming agents are equivalent to each other.

In order to ascertain more in detail the influence of the molding pressure on the porosities and strengths of the final electrode bodies comparative tests were performed partly with a finely crystalline ammonium bicarbonate, partly with a finely crystalline, anhydrous barium chloride as pore-forming agents. Nickel powders with particle sizes of 2.6–3.4 microns according to Fisher were mixed with varying amounts of the pore-forming agents. The mixtures thus obtained were then pressed with different pressures into briquettes which were sintered in an oven at 865° C. for 45 minutes. The sintering operation was performed at said relatively low temperature so as not to cause a melting of the barium chloride. After the sintering operation the bodies with barium chloride were leached with water for about 16 hours. The dimensions of the electrode bodies were 60×12 millimeters with a thickness of about 4 millimeters. After the sintering operation there were measured for each electrode body, porosity, shrinkage in width after cooling to ambient temperature, and breaking strength. The results are summarized in the table below.

| Powder mixture, % by volume | | | Molding pressure MPa | Porosity % | Shrinkage in width % | Breaking strength MPa |
|---|---|---|---|---|---|---|
| Ni | (NH$_4$)HCO$_3$ | BaCl$_2$ | | | | |
| 7 | 93 | — | 30 | 90.4 | 21 | 0.96 |
|   |    |   | 70 | 89.8 | 18 | 1.53 |
|   |    |   | 140 | 89.6 | 17 | 2.50 |
| 6 | 94 | — | 30 | 91.2 | 23 | 0.61 |
|   |    |   | 70 | 90.6 | 19 | 1.00 |
|   |    |   | 140 | 90.8 | 16 | 2.47 |
| 5 | 95 | — | 30 | 93.0 | 16 | 0.20 |
|   |    |   | 70 | 92.7 | 16 | 0.37 |
|   |    |   | 140 | 92.7 | 15 | 0.69 |
| 9 | — | 91 | 30 | 89.6 | 6 | 1.84 |
|   |   |    | 70 | 88.2 | 5 | 2.50 |
|   |   |    | 140 | 87.7 | 4 | 2.64 |
| 8 | — | 92 | 30 | 90.8 | 5 | 0.92 |
|   |   |    | 70 | 89.6 | 5 | 1.50 |
|   |   |    | 140 | 89.0 | 4 | 2.32 |
| 7 | — | 93 | 30 | 91.9 | 5 | 0.50 |
|   |   |    | 70 | 91.1 | 4 | 0.60 |
|   |   |    | 140 | 90.4 | 4 | 0.65 |

It could be expected that an increase of the molding pressure on the powder mixture before the sintering operation would considerably reduce the pore volume of the final electrode body. However, this is not the case when ammonium bicarbonate is used as a pore-forming agent. As is seen from the table, when using said pore-forming agent the porosities were in several cases the same or even higher when increasing the molding pressure. The explanation may be that the shrinkage is less for an electrode body that has been pressed at a higher pressure. This tendency cannot be seen when using barium chloride as the pore-forming agent. In view of this, as was stated above, a molding pressure of at least about 100 MPa is advantageous. From the table it can also be seen that electrode bodies prepared with ammonium bicarbonate as the pore-forming agent possess higher strengths than those which are prepared with barium chloride and which have similar porosities.

As was also mentioned above, it has turned out, that when using the claimed method the sintering temperature can preferably be raised to between 1000° C. and 1100° C. This means that time can be saved, as the sintering time can be reduced to about 15 minutes, while at the same time the binding forces between the metal grains become even stronger.

What is claimed is:

1. A method of manufacturing highly porous electrode bodies for electrical accumulators, which comprises:
    (a) mixing into an intimate mixture 5–7% by volume of a nickel powder with 93–95% by volume of a powdered pore-forming agent selected from the group consisting of ammonium bicarbonate and ammonium carbonate;
    (b) pressing the mixture into a compacted body; and (c) sintering the compacted body to form said highly porous electrode body.

2. A method as claimed in claim 1, wherein the mixture is pressed with a mold pressure of at least 100 MPa.

3. A method as claimed in claim 2, wherein 5-6% by volume of the nickel powder is mixed with 94-95% by volume of the pore-forming agent selected from the group consisting of ammonium bicarbonate and ammonium carbonate.

4. A method as claimed in claim 2, wherein the compacted body is sintered at a temperature within the range of 1000°-1100° C.

5. A method as claimed in claim 2, wherein the particle size of the pore-forming agent selected from the group consisting of ammonium bicarbonate and ammonium carbonate is above 0.3 millimeters.

6. A method as claimed in claim 2, wherein the mixture is pressed into a compacted body on a conductive support.

7. Highly porous electrode bodies for electrical accumulators, which are obtained by:
(a) mixing into an intimate mixture 5-7% by volume of a nickel powder with 93-95% by volume of a powdered pore-forming agent selected from the group consisting of ammonium bicarbonate and ammonium carbonate;
(b) pressing the mixture into a compacted body; and
(c) sintering the compacted body to form said highly porous electrode body.

8. Electrode bodies as claimed in claim 7, wherein the mixture is pressed with a mold pressure of at least 100 MPa.

9. Electrode bodies as claimed in claim 8, wherein 5-6% by volume of the nickel powder is mixed with 94-95% by volume of the pore-forming agent selected from the group consisting of ammonium bicarbonate and ammonium carbonate.

10. Electrode bodies as claimed in claim 8, wherein the compacted body is sintered at a temperature within the range of 1000°-1100° C.

11. Electrode bodies as claimed in claim 8, wherein the particle size of the pore-forming agent selected from the group consisting of ammonium bicarbonate and ammonium carbonate is above 0.3 millimeters.

12. Electrode bodies as claimed in claim 8, wherein the mixture is pressed into a compacted body on a conductive support.

* * * * *